(12) United States Patent
Lockwood et al.

(10) Patent No.: US 10,323,431 B2
(45) Date of Patent: Jun. 18, 2019

(54) CONCRETE EQUIPMENT TOWER WITH TENSIONING TENDON GUIDE SLOT

(71) Applicant: SIEMENS GAMESA RENEWABLE ENERGY, INC., Orlando, FL (US)

(72) Inventors: James D. Lockwood, Boulder, CO (US); Panos Kiousis, Boulder, CO (US)

(73) Assignees: WIND TOWER TECHNOLOGIES, LLC, Boulder, CO (US); SIEMENS GAMESA RENEWABLE ENERGY, INC, Orlando, FL (US)

( * ) Notice: Subject to any disclaimer, the term of this patent is extended or adjusted under 35 U.S.C. 154(b) by 0 days.

(21) Appl. No.: 15/750,589

(22) PCT Filed: Aug. 3, 2016

(86) PCT No.: PCT/US2016/045221
§ 371 (c)(1),
(2) Date: Feb. 6, 2018

(87) PCT Pub. No.: WO2017/039922
PCT Pub. Date: Mar. 9, 2017

(65) Prior Publication Data
US 2019/0010722 A1   Jan. 10, 2019

Related U.S. Application Data

(60) Provisional application No. 62/212,027, filed on Aug. 31, 2015.

(51) Int. Cl.
*E04H 12/12* (2006.01)
*E04H 12/16* (2006.01)
*F03D 13/20* (2016.01)

(52) U.S. Cl.
CPC ............. *E04H 12/12* (2013.01); *E04H 12/16* (2013.01); *F03D 13/20* (2016.05); *Y02E 10/728* (2013.01)

(58) Field of Classification Search
CPC .......... E04H 12/12; E04H 12/16; F03D 13/20
See application file for complete search history.

(56) References Cited

U.S. PATENT DOCUMENTS

| 937,794 | A | * | 10/1909 | Haas | ......................... E04C 3/34 52/223.4 |
| 4,166,347 | A | | 9/1979 | Pohlman et al. | |

(Continued)

FOREIGN PATENT DOCUMENTS

| AT | 290078 B | * | 5/1971 | ............. B65D 90/02 |
| CA | 2880788 A1 | * | 2/2014 | ............. E04H 12/16 |

(Continued)

OTHER PUBLICATIONS

PCT International Search Report and Written Opinion of International Searching Authority dated Oct. 18, 2016 corresponding to PCT International Application No. PCT/US2016/045221 filed Aug. 3, 2016.

*Primary Examiner* — Jeanette E Chapman

(57) ABSTRACT

A precast concrete post-tensioned segmented equipment tower including a lower segment of a relatively larger diameter, an upper segment of a relatively smaller diameter, and a transition segment there between, with a post-tensioning tendon spanning these segments and imparting a compressive pre-load between the segments, and a slot formed in an inwardly protruding surface of the transition segment for receiving and laterally retaining the tendon during installation and tensioning. The slot may be defined in a saddle formed of high density polyurethane which is cast into the inwardly protruding surface. An intrados surface of the saddle may be curved to impart a bend in the tendon.

15 Claims, 3 Drawing Sheets

(56) References Cited

U.S. PATENT DOCUMENTS

| | | | | |
|---|---|---|---|---|
| 4,738,058 | A | * | 4/1988 | Svensson ................ F21V 21/10 |
| | | | | 52/223.4 |
| 4,929,650 | A | * | 5/1990 | Kurauchi ............... C08G 59/18 |
| | | | | 523/455 |
| 8,220,212 | B2 | * | 7/2012 | Stiesdal .................. E04H 12/16 |
| | | | | 52/223.13 |
| 2012/0159875 | A1 | * | 6/2012 | Meyer ................... E04H 12/182 |
| | | | | 52/115 |
| 2014/0033628 | A1 | | 2/2014 | Lockwood et al. |
| 2018/0238070 | A1 | * | 8/2018 | Chase ..................... E04H 12/12 |
| 2018/0238071 | A1 | * | 8/2018 | Chase ..................... E04H 12/16 |

FOREIGN PATENT DOCUMENTS

| | | | | |
|---|---|---|---|---|
| DE | 2116538 | A1 * | 2/1973 | ............. E04B 1/215 |
| EP | 2672115 | A2 * | 12/2013 | ........... E04H 12/085 |
| EP | 2746580 | A2 * | 6/2014 | ........... E04H 12/342 |
| EP | 27465820 | A2 | 6/2014 | |
| GB | 1105133 | A | 3/1968 | |
| WO | WO-8602689 | A1 * | 5/1986 | ............. E04H 12/12 |

\* cited by examiner

CONCRETE EQUIPMENT TOWER WITH TENSIONING TENDON GUIDE SLOT

This application claims benefit of the 31 Aug. 2015 filing date of U.S. provisional patent application No. 62/212,027 which is incorporated by reference herein.

FIELD OF THE INVENTION

This invention relates generally to the field of equipment towers, and more particularly, to pre-tensioned concrete equipment towers.

BACKGROUND OF THE INVENTION

U.S. Pat. No. 9,175,670 B2 issued on Nov. 3, 2015, to Lockwood, et al. (hereinafter the '670 patent) describes a post-tensioned concrete tower formed by stacking precast concrete annular segments on a foundation, wherein the diameter of the segments varies in stages over the height of the tower, with a group of segments having one diameter being separated from a group of segments having a different diameter by a transition segment. This tower geometry simplifies the formwork used to precast the segments when compared to tower designs wherein each segment is different as the tower varies gradually in diameter over the height of the tower.

BRIEF DESCRIPTION OF THE DRAWINGS

The invention is explained in the following description in view of the drawings that show.

DETAILED DESCRIPTION OF THE INVENTION

The present inventors have developed a further improvement to the equipment tower design disclosed in the '670 patent. That design provides for the attachment of post-tensioning tendons between the foundation and the transition segments of the tower, thereby allowing the transition segments to function as anchor members. Each tendon is anchored within a transition segment, and a particular tendon may pass through one or more transition segments via tubes or ducts (column 3 lines 4-5 of the '670 patent) to be terminated in a transition segment at a higher elevation on the tower. The present inventors have recognized that the process of feeding the post-tensioning tendons through such tubes or ducts can be time consuming and may increase the chance of tendon damage or personal injury. The present invention eliminates the need for all or most of such tubes or ducts while still providing the designer with the flexibility of anchoring a tendon to a transition segment other than the lowest transition segment of the tower.

Figure 1:
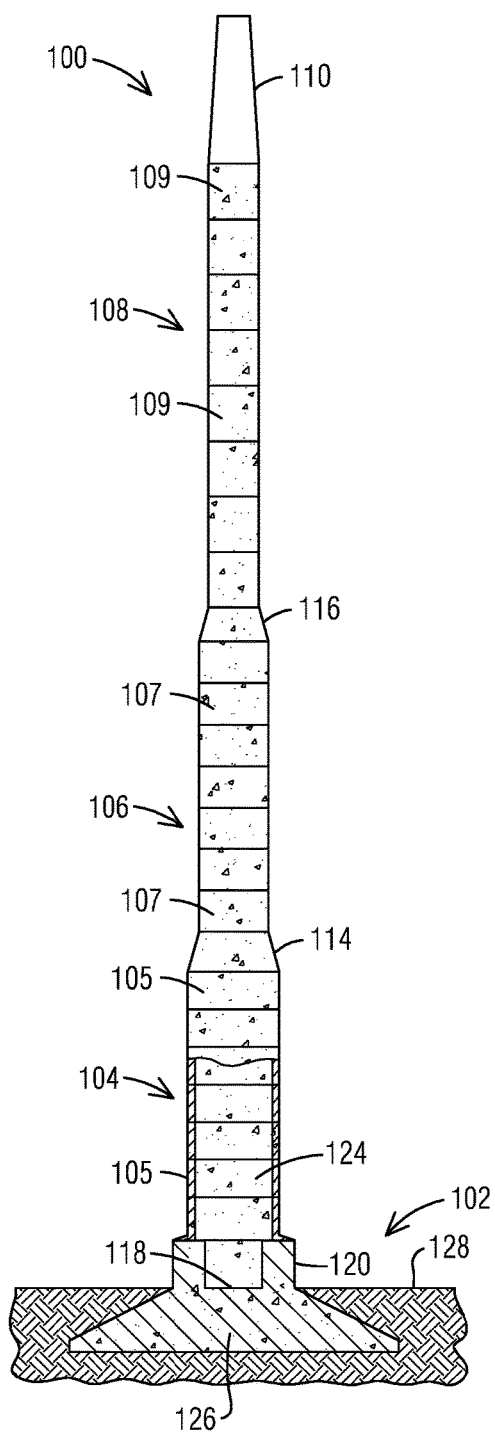
FIG. 1 is an elevational view of an equipment tower in partial cross-section.

FIG. 1 illustrates an exemplary equipment tower 100 that may embody the present invention. The tower 100 is a wind turbine tower, which supports various types of equipment. Such equipment may be affixed at or proximate the top of the equipment tower 100 or affixed at desired locations along the length of the equipment tower 100 depending on a particular application. Tower 100 may include a foundation 102, a bottom tower portion 104, a middle tower portion 106, a top tower portion 108 and a steel tip adapter 110. The steel tip adapter 110 may be used to support the nacelle of a wind turbine (not shown). Each tower portion 104, 106, 108 may be formed with a plurality of tower segments 105, 107, 109, respectively, that may be formed of precast concrete. Each tower segment 105 may have a first constant diameter and a first height, each tower segment 107 may have a second constant diameter and a second height and each tower segment 109 may have a third constant diameter and a third height. As illustrated in FIG. 1, the first constant diameter of tower segments 105 may be greater than the second constant diameter of tower segments 107, which in turn are greater than the third constant diameter of tower segments 109, thereby forming an equipment tower 100 that decreases in diameter from the bottom tower portion 104 to the top tower portion 108. Transition segments 114 and 116 may be positioned between appropriate tower portions 104, 106, 108 to accommodate the progressive change in the diameter of tower segments 105, 107, 109 from the bottom to the top of equipment tower 100.

FIG. 1 further illustrates foundation 102 that may include a platform 118 and a subsection 126 extending below ground level 128. A pedestal or plinth 120 extends from platform 118. The tower 100 and has an inside surface that defines an internal chamber 124. Steel cable or tendons (not shown) used to post-tension the concrete of tower 100 may be located outside of the tower 100 or within the internal chamber 124, as more fully described below.

Figure 2:
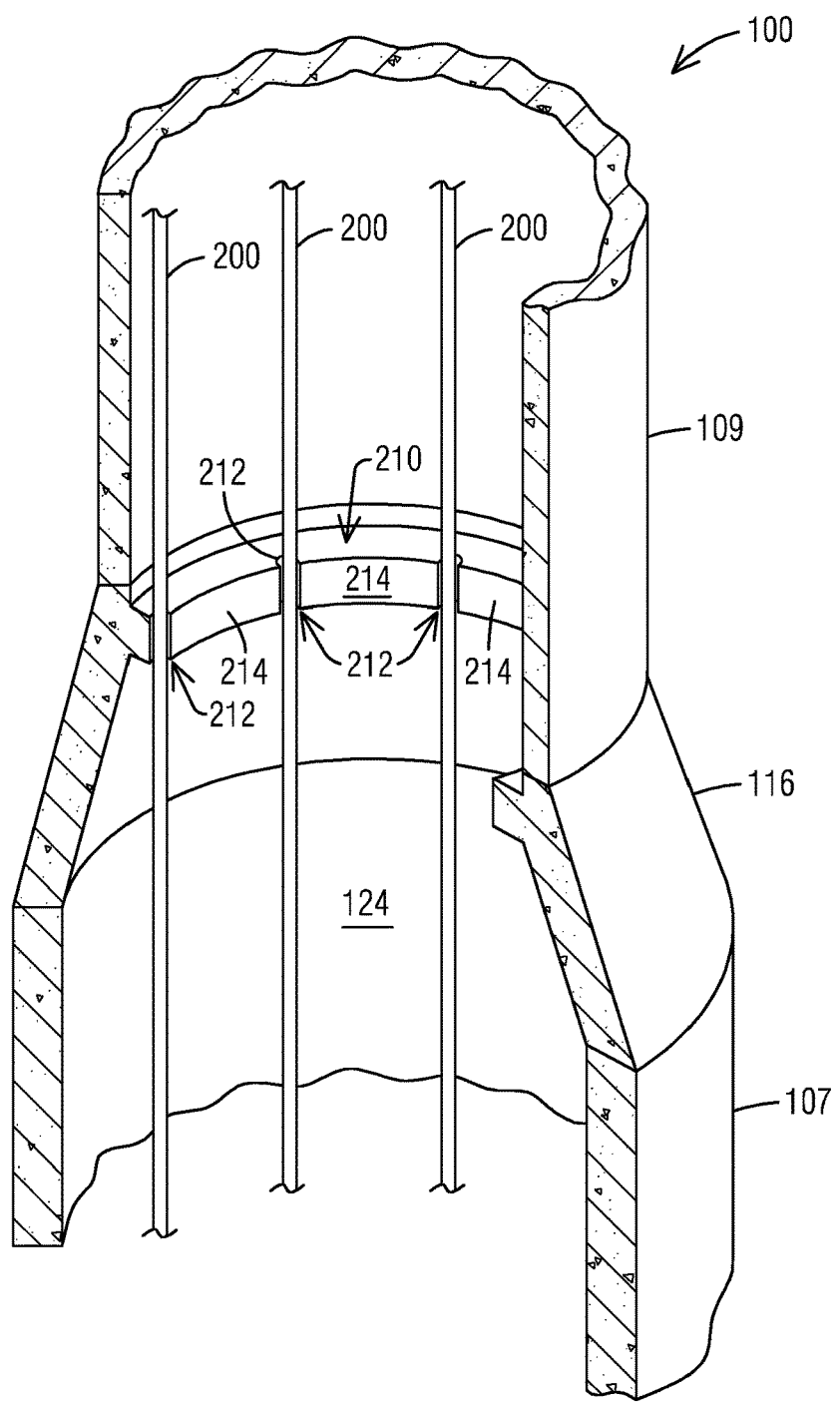
FIG. 2 is a partial sectional elevational view of a transition section of a tower after installation of tensioning tendons.

FIG. 2 is a partial sectioned elevation view of the equipment tower 100 of FIG. 1 illustrating the region of transition segment 116 at a stage of construction after tensioning tendons 200 have been installed within the internal chamber 124. In this view it can be appreciated that lower segment 107 has a first inside diameter and upper segment 109 has a second inside diameter smaller than the first inside diameter. Transition segment 116 is disposed between the lower and upper segments 107, 109. Transition segment 116 includes a diaphragm ring 210 which has an intrados face 214 which protrudes inwardly toward a vertical longitudinal centerline of the tower to define yet a smaller diameter. Whereas prior art tower designs have included tubes or ducts formed through the diaphragm ring 210 to allow passage of the tensioning tendons 200, the present invention includes slots 212 formed into the intrados face 214 for receiving and laterally retaining the tendons 200. The tendons 200 span the lower, transition and upper segments 107, 116, 109 and are tensioned to apply a compressive load between those segments 107, 116, 109.

While FIG. 2 illustrates the slots 212 being formed in an inwardly protruding diaphragm ring 210, one will appreciate that such tendon-retaining slots may be formed in any appropriate interior or exterior surface of an equipment tower proximate a designed operating position of a tendon in order to capture, guide and control the tendon during the tendon installation and tensioning processes. The embodiment of FIG. 2 illustrates the slots 212 being formed in a concrete diaphragm ring 210 cast as part of the transition segment 116, but the diaphragm ring may be formed of other materials and may be installed into the transition segment after it is cast. Moreover, the slots 212 are illustrated as having a general "U" shape for accommodating only one tendon 200 each, but other slot designs may accommodate more than one tendon, such as a "W" shaped slot for capturing two closely spaced tendons.

Figure 3:
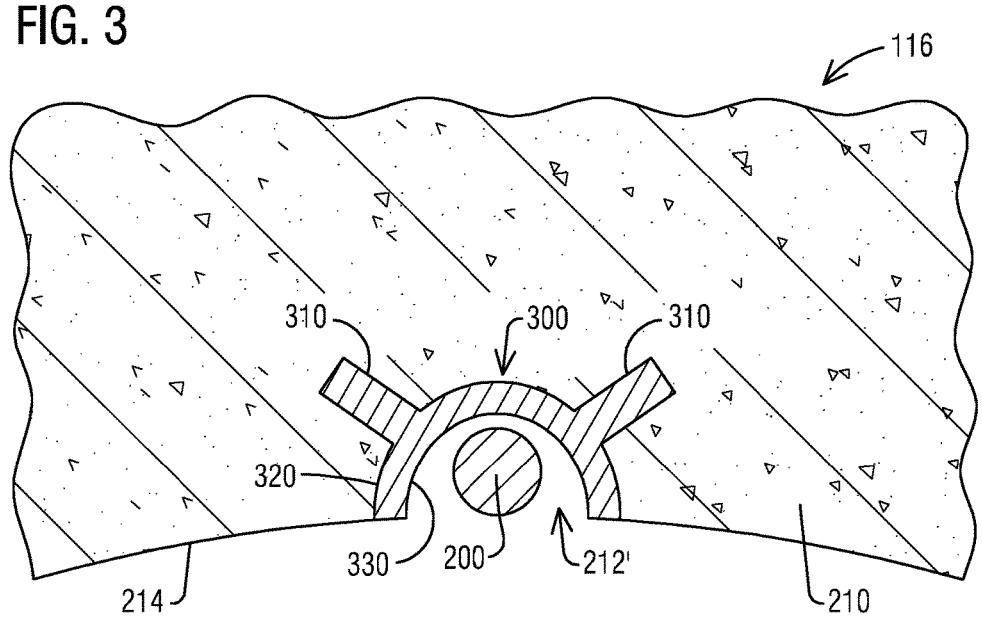
FIG. 3 is a partial plan view of one embodiment of a slot formed in an equipment tower for receiving a tensioning tendon.
Figure 4:
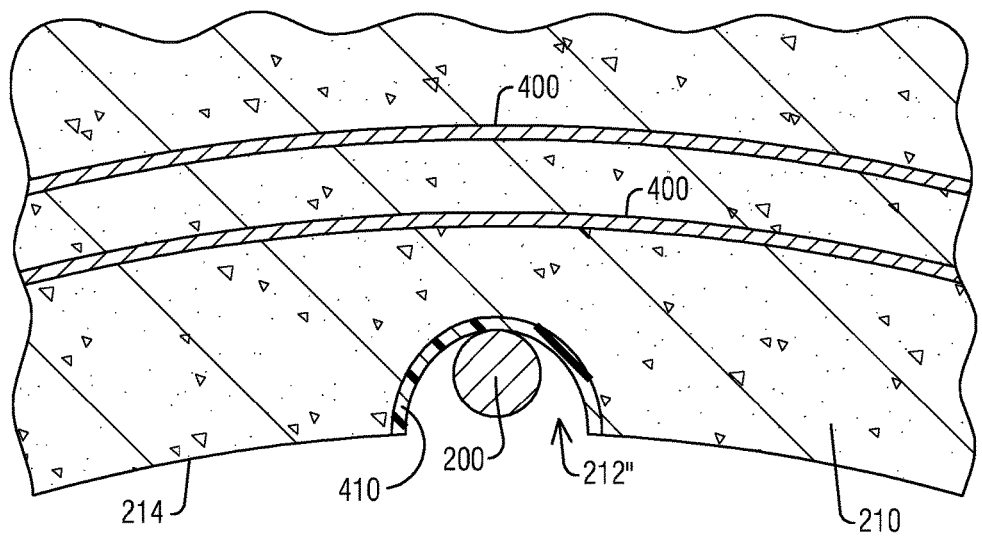
FIG. 4 is a partial plan view of another embodiment of a slot formed in an equipment tower for receiving a tensioning tendon, also showing reinforcing structures in the tower for carrying radial loads imposed by the tendon.

FIGS. 3 and 4 illustrate two alternative embodiments of the slots 212 of FIG. 2 as seen in partial plan views looking downward from above one slot 212 along the longitudinal axis of the tendon 200.

FIG. 3 illustrates a slot 212' formed into the intrados face 214 of diaphragm ring 210. In this embodiment, the slot 212' is defined by a saddle 300 which is retained within the cast concrete of the diaphragm ring 210 by two protrusions 310 extending from an extrados surface 320 of the saddle 300. The concrete is cast around the protrusions 310, which are thereby made effective to interlock the saddle 300 and the transition segment 116. The saddle 300 may be formed of a high density polyurethane or other plastic material, for example, or any other material suitable for the environment and for interfacing with the concrete of the diaphragm ring 210. In the embodiment of FIG. 3, the tendon 200 does not contact the slot 212' under normal conditions, however the open mouth shape of the intrados surface 330 of saddle 300 is effective for capturing and retaining the tendon 200 as it is moved into position during the post-tensioning process. In other embodiments the tendon 200 may contact the saddle 300, with the material of the saddle 300 being selected to accommodate such contact.

FIG. 4 illustrates another embodiment of a slot 212" which is simply a shape formed into the intrados face 214 of the diaphragm ring 210 either during its casting process or afterward by a material removal process. In this embodiment, the tendon 200 rubs against the surface of the slot 212" under normal conditions and exerts a force radially outwardly into the transition segment 210. One or more reinforcing structures, such as embedded rebar 400 for example, may be used to resist the loads imposed on the transition segment 210 by the tendon 200. A coating 410 of a friction reducing material and/or an abrasion resistant material (when compared to concrete), such as epoxy or plastic for example, may be applied onto the concrete within the slot 212" to reduce wear during installation and operation of the tower 100.

Figure 5:
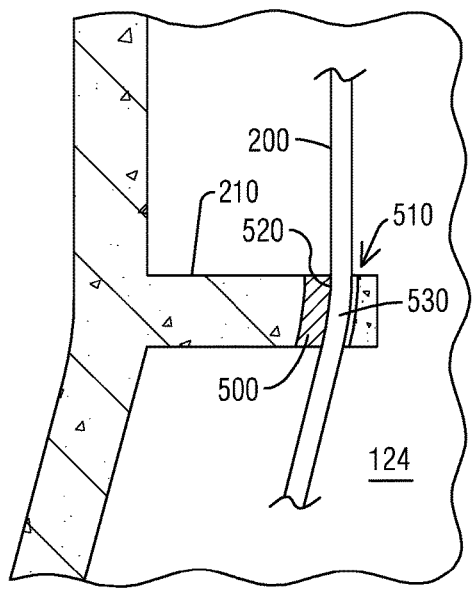
FIG. 5 is a partial elevational view of a transition section of a tower illustrating a saddle having a curved surface for imparting a bend on a tensioning tendon.

FIG. 5 is an elevational view of another embodiment of a saddle 500 attached to a diaphragm ring 210 and defining a slot 510 for receiving and retaining a tensioning tendon 200 in an equipment tower. FIG. 5 illustrates the saddle 500 in a partial sectional view to show that its intrados surface 520, upon which the tendon 200 rubs, is curved in order to impart a bend 530 in the tendon 200. Keeping the tendon close to the wall of the tower along its length helps to preserve space within the internal chamber 124 of the tower for other uses, such as for mounting equipment associated with the operation of the tower. The material of construction of the saddle 500 may be selected to prevent damage to the tendon 200 during installation and use.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An equipment tower comprising:
    a stacked plurality of concrete tower segments comprising a lower segment defining a first inside diameter and an upper segment defining a second inside diameter smaller than the first inside diameter, and a transition segment disposed between the lower and upper segment;
    a tendon spanning the lower, transition and upper segments and tensioned to apply a compressive load between those segments; and
    a slot in a surface of the transition segment, the slot receiving and laterally retaining the tendon,
    a saddle attached to the transition segment and defining the slot,
    wherein the saddle comprises a high density polyurethane or other plastic material,
    wherein an extrados surface of the saddle comprises a protrusion effective to interlock the saddle and the transition segment.

2. The equipment tower of claim 1, wherein the saddle comprises an intrados surface which is curved to impart a bend in the tendon.

3. The equipment tower of claim 1, wherein the slot is cast into concrete forming the transition segment, and further comprising a coating applied onto the concrete within the slot.

4. An equipment tower comprising:
    a stacked plurality of concrete tower segments comprising a lower segment defining a first inside diameter and an upper segment defining a second inside diameter smaller than the first inside diameter, and a transition segment disposed between the lower and upper segment;
    a tendon spanning the lower, transition and upper segments and tensioned to apply a compressive load between those segments; and
    a slot in a surface of the transition segment, the slot receiving and laterally retaining the tendon,
    wherein the transition segment comprises a reinforcing structure for resisting loads imposed on the transition segment by the tendon.

5. The equipment tower of claim 4, further comprising a saddle attached to the transition segment and defining the slot.

6. The equipment tower of claim 4, wherein the saddle comprises a high density polyurethane or other plastic material.

7. The equipment tower of claim 4, wherein the saddle comprises an intrados surface which is curved to impart a bend in the tendon.

8. The equipment tower of claim 4, wherein the slot is cast into concrete forming the transition segment, and further comprising a coating applied onto the concrete within the slot.

9. The equipment tower of claim 8, wherein the coating comprises one of a friction reducing material and an abrasion resistant material when compared to concrete.

10. In a precast concrete post-tensioned segmented equipment tower comprising a lower segment of a relatively larger diameter and an upper segment of a relatively smaller diameter, an improvement comprising:
    a slot formed in a surface of the tower for receiving and laterally retaining a post-tensioning tendon of the tower; and
    a saddle defining the slot, the saddle attached to a transition segment of the tower disposed between the lower and upper segments, wherein the saddle comprises a protrusion extending into concrete forming the transition segment effective to interlock the saddle and the transition segment.

11. The improvement of claim 10, wherein the slot is formed into a transition segment of the tower disposed between the lower and upper segments.

12. The improvement of claim 10, wherein the saddle comprises an intrados surface which is curved to impart a bend in the tendon.

13. The improvement of claim 10, wherein the saddle comprises a high density polyurethane or other plastic material.

14. The improvement of claim 10, wherein the slot is cast into concrete forming a transition segment of the tower disposed between the lower and upper segments, and further comprising a coating applied onto the concrete within the slot.

15. The improvement of claim 14, wherein the coating comprises one of a friction reducing material and an abrasion resistant material when compared to concrete.

* * * * *